United States Patent [19]

Woollard

[11] 4,020,711
[45] May 3, 1977

[54] DRIVE SYSTEM
[75] Inventor: Gary A. Woollard, Ithaca, N.Y.
[73] Assignee: Borg-Warner Corporation, Chicago, Ill.
[22] Filed: June 11, 1975
[21] Appl. No.: 585,900
[52] U.S. Cl. .................. 74/230.17 E; 74/230.17 A; 74/230.17 C
[51] Int. Cl.² .......................................... F16H 9/00
[58] Field of Search ........... 74/230.17 A, 230.17 C, 74/230.17 E

[56] References Cited
UNITED STATES PATENTS

| | | | |
|---|---|---|---|
| 2,101,084 | 12/1937 | Meyers | 74/230.17 E |
| 2,256,699 | 9/1941 | Almen | 74/230.17 C |
| 2,924,108 | 2/1960 | Maroldt | 74/230.17 C |
| 2,973,655 | 3/1961 | Rix | 74/230.17 C |
| 3,060,759 | 10/1962 | Van der Brugghen | 74/230.17 C |
| 3,129,597 | 4/1964 | Prior | 74/230.17 C |
| 3,664,206 | 5/1972 | Clauss, Jr. | 74/230.17 E |
| 3,727,476 | 4/1973 | Heidorn | 74/230.17 E |
| 3,757,593 | 9/1973 | Svenson | 74/230.17 E |
| 3,786,688 | 1/1974 | Svenson | 74/230.17 A |
| 3,869,932 | 3/1975 | Fletcher | 74/230.17 C |

FOREIGN PATENTS OR APPLICATIONS 638,082 10/1959 Italy .......................... 74/230.17 E Primary Examiner—C. J. Husar
Attorney, Agent, or Firm—Aubrey L. Burgess

[57] ABSTRACT

A drive system for driving accessories associated with the engine of a vehicle and controlled by the speed of the engine crankshaft, constructed such that the rpm of each accessory is substantially constant over at least the major portion of the normal vehicle operating range regardless of increase in the rpm of the engine and its crankshaft. The drive is so constructed that the input rpm to each accessory increases at substantially the same rate as the rpm of the crankshaft to a first, predetermined speed; then the input to each accessory is substantially constant thereafter regardless of increasing engine speed to a second predetermined crankshaft speed. This second predetermined speed preferably corresponds essentially to the established national speed limit.

25 Claims, 11 Drawing Figures

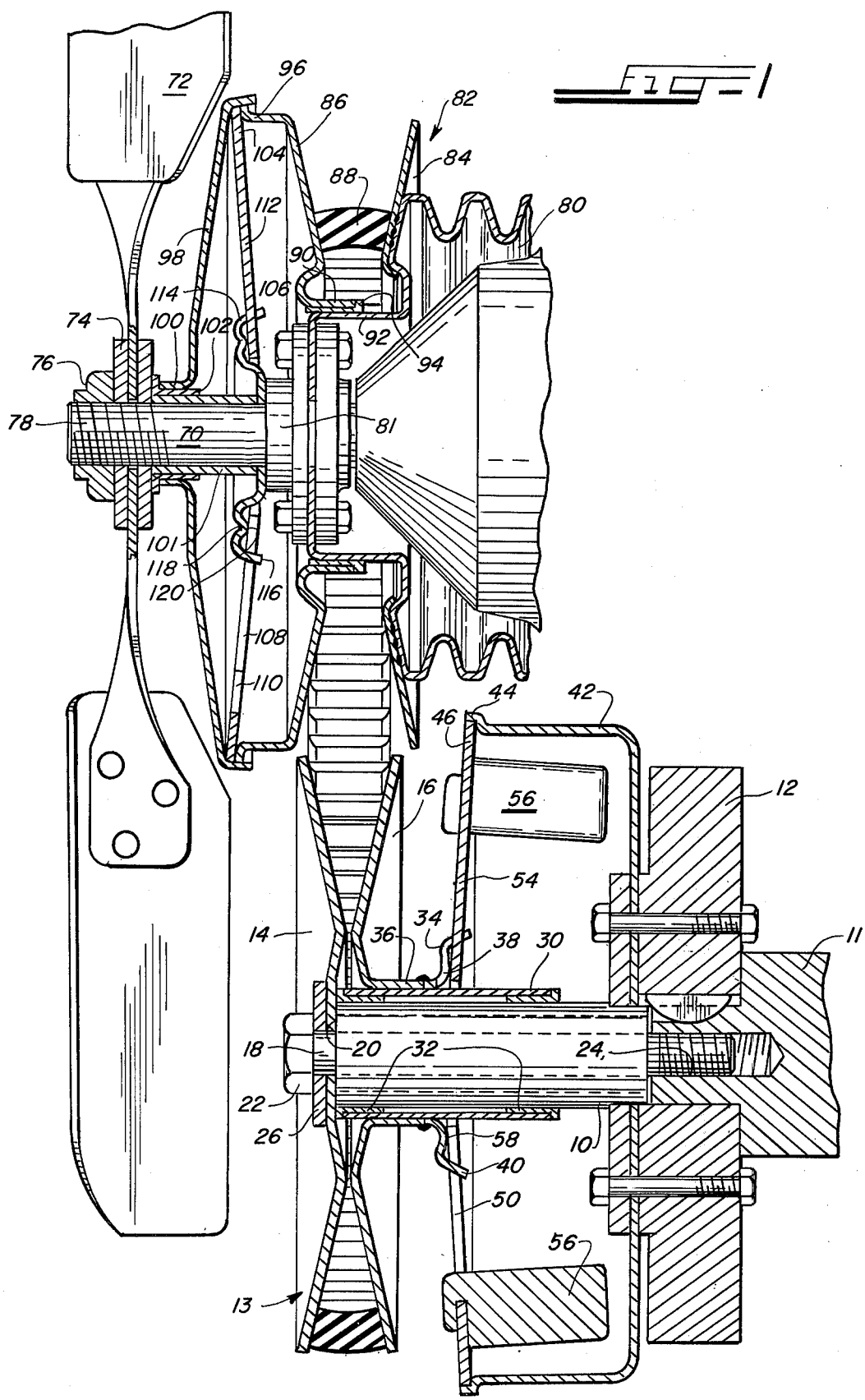

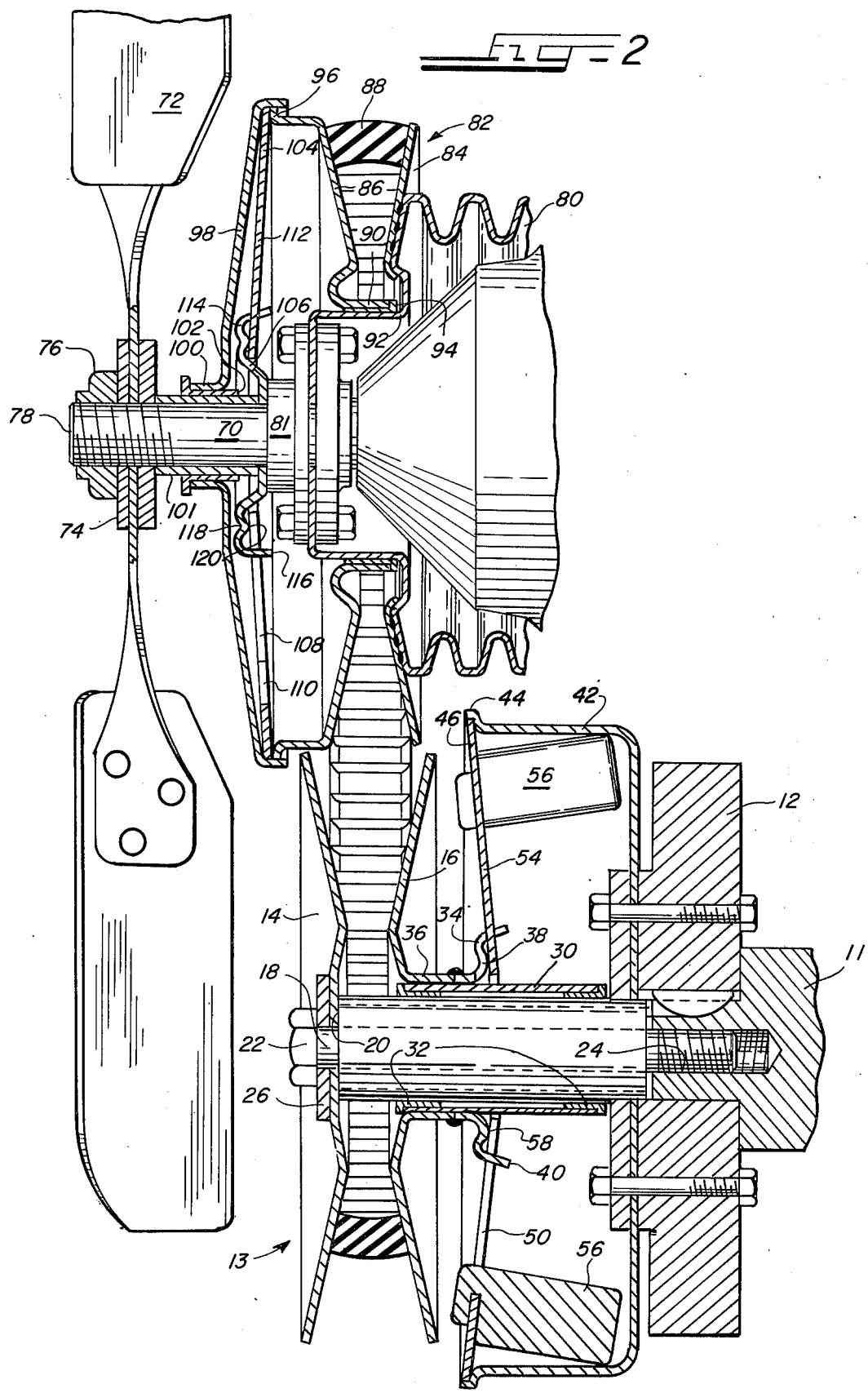

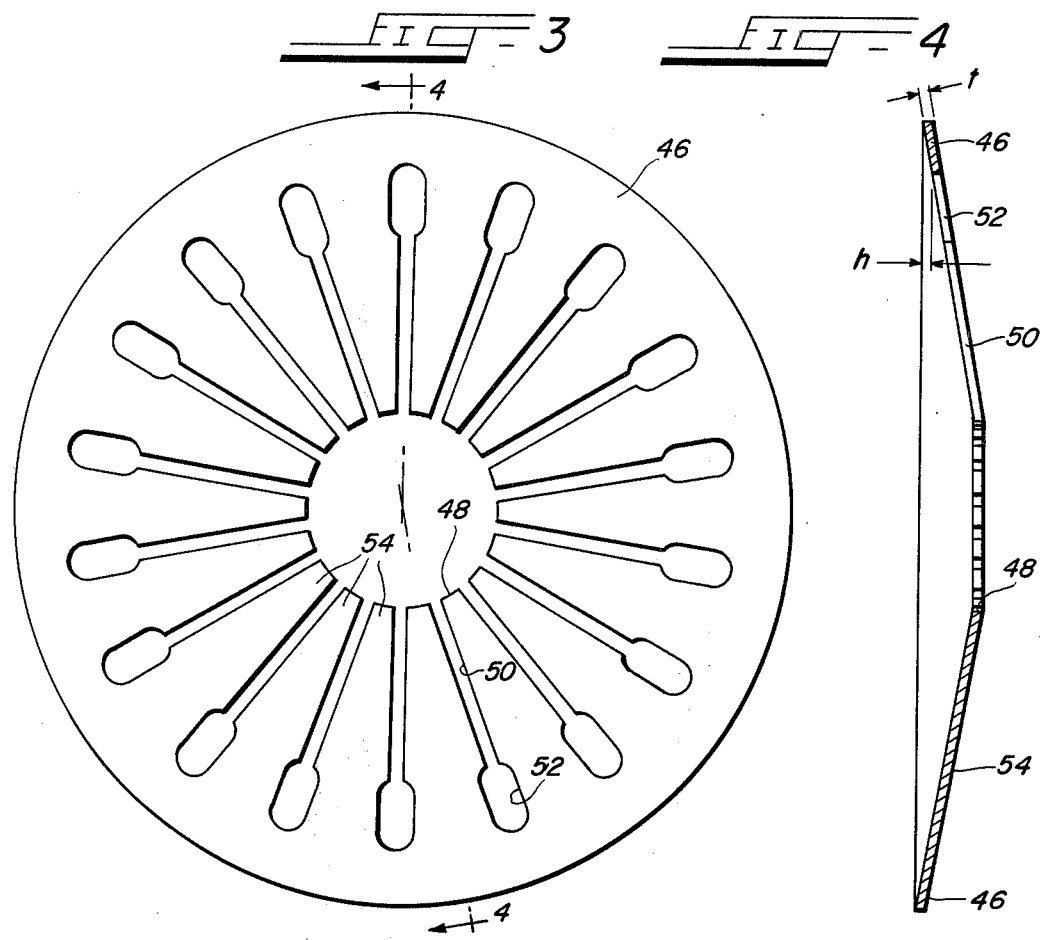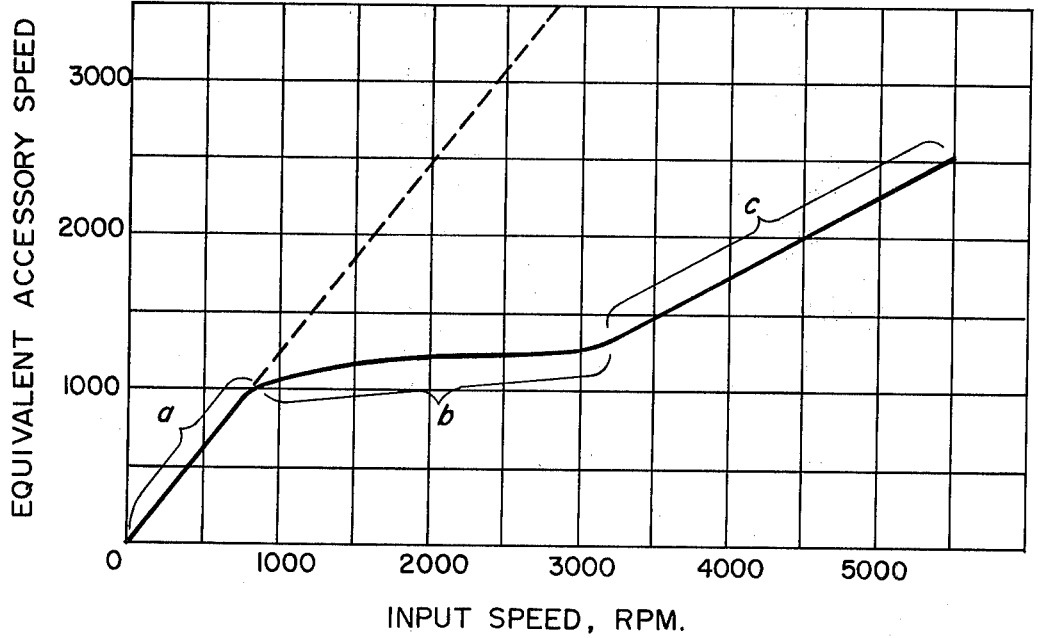

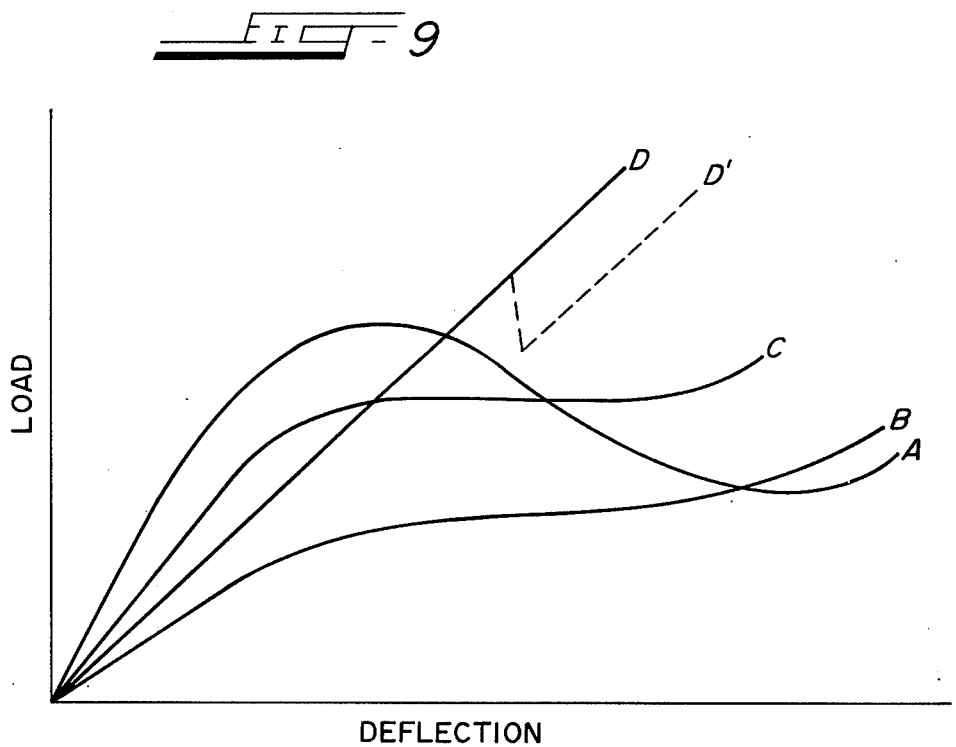
FIG-9
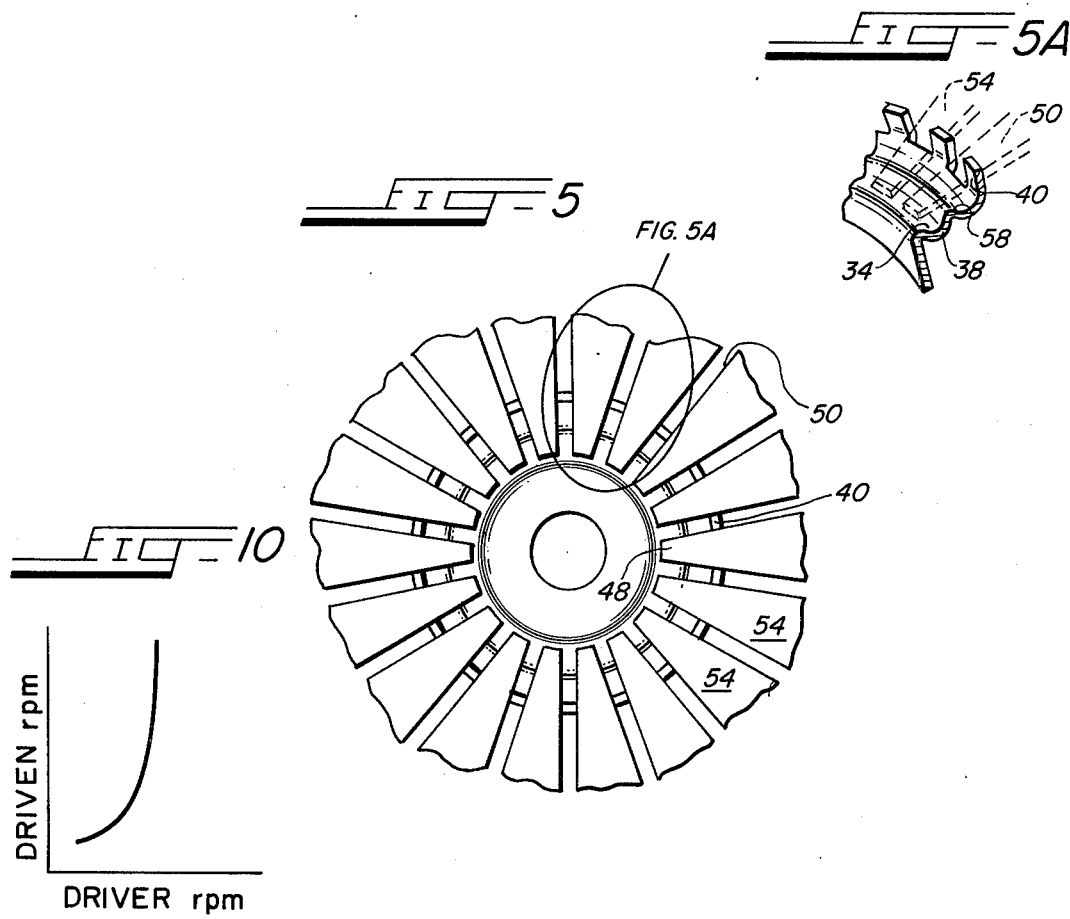
FIG-5A
FIG-5
FIG-10

DRIVE SYSTEM

BACKGROUND OF THE INVENTION

Modern vehicle engines have been called upon to drive an increasing number of accessories as the sophistication of modern vehicles increases, which accessories include many convenience items demanded by the customer.

Generally the accessory drive provides at least a linear ratio between the speed (rpm) of the engine and the speed (rpm) of the accessory driven shaft. At low engine speeds, no serious problems exist; but at high engine speeds serious problems exist. Because of this relationship, it is imperative to construct the accessory with proper bearings, so that it can operate at elevated speeds without an undue limitation on its life. The strength and size of rotating parts must be such that extremely high speeds do not rupture them. In addition, the wide variation in operating speed of an accessory at times creates a demand for sophisticated control systems. Such construction makes the accessory more expensive than necessary or desirable both as original equipment (OEM) parts and as replacement parts. Driving the accessories at very high speeds results in a substantial decrease in the efficiency of the vehicle because a substantial percentage of the output is required for the accessory drive, which can amount to up to about 30 percent of the engine horsepower at moderate speeds. This is extremely wasteful because the present fixed ratio drives result in accessory speeds which are not required for proper operation of the accessories.

This problem becomes even more severe in some modern engines which are of relatively low horsepower and which operate at relatively high speeds. Further, the lack of efficiency of the system requires the use of more gasoline — a needless and serious waste of energy. In addition, each accessory normally has a most efficient or optimum RPM range and with normal systems the accessory is not within this range due to wide variation in the input speed.

Various energy saving types of accessory drives have been proposed. For example, the drive between the engine and the fan for cooling the radiator has been thermostatically controlled. This type of drive is temperature dependent and has no relation to engine shaft speed. Such drive is not suitable for alternator or generator drive because these accessories must be driven continuously when the engine is operating. Other types of drives employ slipping friction clutches; while they may be successful, they have not found acceptance because of the cost of the drive and energy losses during operation.

For an accessory drive system to meet requirements for use in modern vehicles, it should be small enough to fit in present-day engine compartments without any substantial modifications, it should be relatively inexpensive, it should be susceptible of mass production and adjustable to modern assembly techniques, it should have long life, and it should produce a drive from the engine to the accessories which increases their speeds in approximately a linear relation with increasing engine speed at low RPM but which produces relatively constant accessory speeds as the engine speed increases above a predetermined point throughout the normal vehicle driving range. The present invention meets all these criteria.

The drive of this invention is to be distinguished from the conventional variable pulley transmission as is presently used in, for example, off-the-road vehicles or has been proposed for the transmission for transmitting power from an engine to the driving mechanism of a vehicle, whether they are wheels, lugs or other devices. In such prior transmissions, the engine rpm is increased and, at the same time, the rpm of the driving mechanism is increased at an even faster rate. Further, until a certain driveR pulley rpm is achieved, no power is transmitted to the driveN pulley.

THE INVENTION

This invention relates to a drive system for transmitting torque from a prime mover, such as an automobile engine, to accessories associated therewith. It comprises, a relatively inexpensive assembly of variable diameter pulleys connected by a drive belt. The assembly is preferably constructed mainly of stamped metal parts; the belt is generally the only part which will require replacement even after a considerable length of operating time.

More specifically, the drive system of the present invention comprises a pair of variable pitch diameter pulleys, one, a driveR, associated with the drive shaft and another, a driveN, associated with a driven shaft (which drives the "accessory package"). Each of the variable pulleys has a fixed flange and a movable flange. The movable flange of each pulley is mounted on its associated shaft by a bushing, preferably constructed of a non-metallic material such as nylon or the like. A suitably preloaded disc spring urges the movable flange of the driveN pulley axially toward the fixed flange thereof. The movable flange of the driveR pulley is associated with a disc spring having a plurality of attached weights. The spring, in its rest position, urges the movable flange of the driveR pulley toward the fixed flange thereof. At a predetermined speed, the weights move outwardly because of centrifugal force, and the movable flange is urged axially away from the fixed flange. The movement of the weights is limited by stop means, and thus axial movement of the movable flange from its associated fixed flange is also limited.

Movement of the movable flanges of the pulleys permits the drive belt connecting the pulleys to shift positions relative to the respective shafts and thus provide a different drive ratio between the shafts.

The weights which control the accessory drive mechanism are on the driveR pulley only, so that the control of speed ratios between the pulleys is from the driver only, i.e., from the drive shaft. As such, the device is drive shaft speed sensitive.

The spring rate of the driveR disc spring is substantially continuously positive in slope and the spring has a $h/t$ ratio of about 1, where $h$ is the initial formed height and $t$ is the thickness of the spring.

In the specific embodiment described here, and as graphically illustrated in FIG. 6, the driveR and driveN pulleys rotate at a fixed ratio at relatively low motor speeds, as for example, up to about 1000 rpm. At about 1000 rpm, the weights attached to the disc spring of the driveR pulley begin to move outwardly. As they so move, the driveR pulley continues to rotate at the same speed as the drive shaft while the driveN pulley rotates at a substantially uniform speed of about 1000 rpm. This condition prevails until the drive shaft speed becomes very high, normally associated with vehicle speeds in excess of the national speed limit. At an elevated speed, such for example, at about a drive shaft speed of 3000 rpm, the weights have reached their most outward positions, and thereafter the speed of the driveN pulley then increases with further increases in the drive shaft speed but at a reduced lower ratio as compared to the drive shaft speed. In automobiles built in the United States of America the crankshaft speed, at a vehicle speed of about 55 miles per hour, is generally below 3000 rpm. Thus, in this specific example, over the usual crankshaft speed range of about 1000 to 3000 rpm, the accessories which are each driven at different rpms (determined by the diameter of the specific pulley associated respectively therewith) depending on their function are generally rotated at substantially constant rpms. Thus according to this invention, each accessory can be driven at its optimum or maximum efficiency rpm range over the usual crankshaft speed range of the vehicle.

A device constructed according to this invention and according to the specific embodiment installed in a 1974 Nova has been road tested for at least 15,000 miles. During the road testing, all accessories including air condition have been operated. An energy savings of about 10% has been realized as compared with the same vehicle with the standard accessory drive driving the same accessories.

THE DRAWINGS

FIG. 1 is a sectional view (parts of which are omitted for clarity) through a drive system according to this invention at idle position;

FIG. 2 is a sectional view (parts of which are omitted for clarity) through a drive system according to this invention at one operating position;

FIG. 3 is a plan view of a disc spring useable in the system of FIG. 1;

FIG. 4 is a sectional view of the spring of FIG. 3 taken on line 4—4 of FIG. 3 illustrating the spring before being loaded in the drive assembly;

FIG. 5 is a view of a pilot hub of the invention;

FIG. 5a is a perspective view of the outlined portion of FIG. 5;

FIG. 6 is a set of curves of a specific drive system, drive rpm plotted against equivalent accessory driven rpm or, alternatively, accessory drive shaft rpm, one curve of which is the usual linear relationship and the other of which is a curve obtained using the system of this invention;

FIG. 9 shows spring rate curves of a coil spring, a positive rate disc spring as used in this invention, a zero rate disc spring, and a typical Belleville spring; and FIG. 10 is a curve showing the speed relationship between the driveR and the driveN pulleys in a conventional variable pulley transmission.

DETAILED DESCRIPTION

Figure 7:
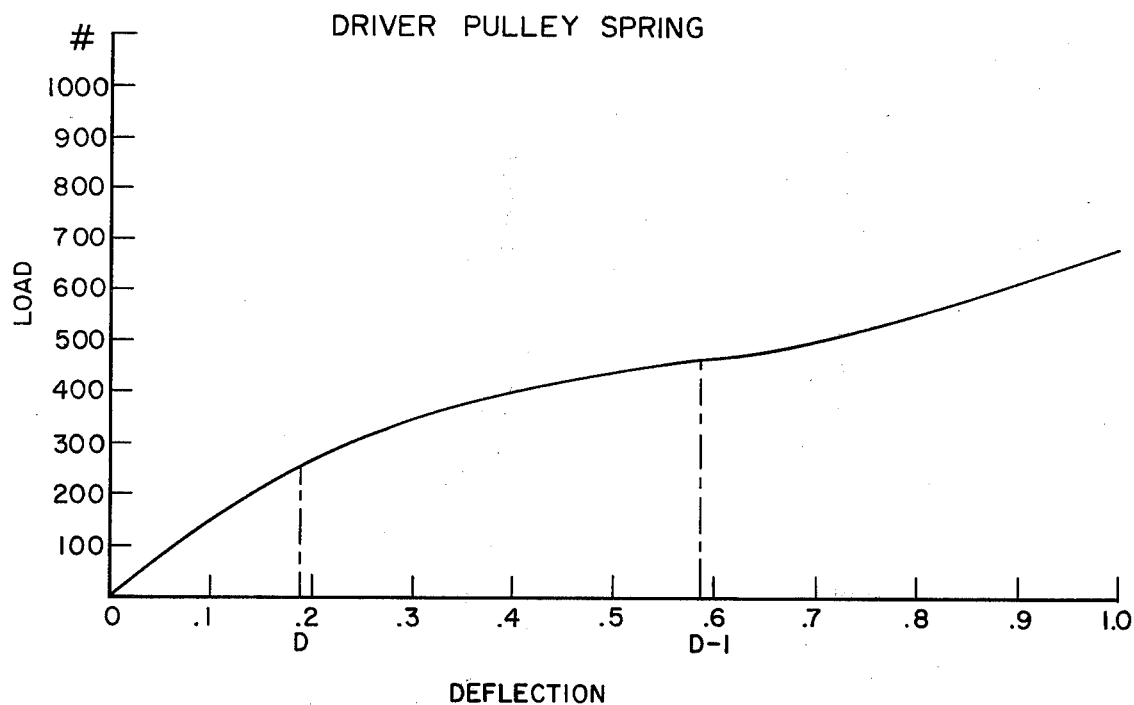
FIG. 7 is a curve in which load is plotted against deflection of a driveR spring for a specific drive system for a drive constructed according to this invention.

In FIG. 1 there is illustrated a preferred embodiment of the invention. Illustrated there is a drive shaft 10 adapted to be connected to the crankshaft 11 through the usual vibration damper 12 of, for example, an automobile engine (not shown). Associated with the crankshaft is a variable driveR pulley, generally identified as 13, which comprises a fixed flange 14 and a movable flange 16. The flange 14 is received on a reduced shaft portion 18 on drive shaft 10 to abut a shoulder 20 formed in the drive shaft. Flange 14 is held in position on shaft 10 by a bolt 22 in threaded engagement with a threaded bore 24 and a washer 26. The movable flange 16 is press fitted onto a cylindrical sleeve 30 mounted on a bushing means 32 surrounding the shaft 10. The bushing means 32 is preferably constructed of a suitable material, such as nylon or the like and may comprise a single part. The flange 16, together with the sleeve 30, is axially movable relative to the fixed flange 14 and the shaft 10. A pivot or drive hub 34 is fixed to a cylindrical portion 36 of the flange 16, as for example by welding.

The hub 34 comprises essentially a thrust ring or washer 38 with fingers or drive tangs 40 extending therefrom.

An actuator mechanism for the movable flange 16 is provided and includes a cup-shaped, spring retainer or drive member 42 preferably of stamped steel is fixed to shaft 10 as for example by welding, and bolted to the vibration damper 12; the periphery of the retainer 42 terminates in an enlarged rim 44. The rim 44 receives and is frictionally engaged by the outer peripheral rim of a disc spring 46. Thus a frictional driving connection is established between the disc spring and the rim of the retainer. As illustrated in FIGS. 3 and 4 spring 46 has a plurality of inwardly extending fingers 54 which terminate in a central opening 48 of a dimension to surround the sleeve 30. A plurality of radial slots 50, each of which terminate in an enlarged opening 52 at the outer end define the plurality of radial fingers 54. A plurality of weights 56 having portions extending through the openings 52 are attached, as by swaging, coining, riveting, or the like to the spring 46, and the spring 46 is coupled to the movable flange 16 by means of the pivot hub 34, i.e., a tang 40 extends through a slot 50 and a finger engages the outer surface 58 of the washer 38, the surface 58 acting as a fulcrum, as will be explained. One weight 56 per opening 52 may be provided; a lesser number of weights can be used, as necessary to perform the function to be described.

The actuator mechanism for the movable flange 16 thus includes the sheet metal drum 42 described above as a spring retainer or drive member having disposed therein disc spring 46 and weights 56.

The length of the cylindrical portion 36 is chosen to properly pre-load the spring 46. In its pre-loaded condition, the spring is compressed from its initial formed condition, thus lessening the height of the cone, as such, it maintains pressure on the movable flange 16 to prevent slippage between the drive belt 88 and the pulley flanges 14 and 16.

It is to be understood that other structure can be provided to pre-load the spring 46, as for example, various machined threaded sleeves and nuts; however, such structure adds to the cost of the apparatus and defeats a main objective, i.e., to provide an apparatus which is both inexpensive and effective for its intended purpose.

Torque transmission between the fixed pulley flange 14 and the movable pulley flange 16 occurs due to friction between the outer rim of the disc spring 46 and the corresponding rim 44 of the retainer 42. There are no torque pins, torque transmitting of or keys, thus eliminating any wear, fretting or failure that may occur because of bending, twisting and binding when such elements are used. The described structure eliminates splines and drive lugs which have to slide under load and which require lubrication. Thus the structure eliminates the need for such lubrication.

FIG. 1 also illustrates a driven shaft 70, suitably supported by appropriate journals (not shown), having affixed thereto, for illustrative and exemplitive purposes only, a multi-bladed fan 72. The fan 72 has a circular hub 74 and is affixed to the shaft 70 by a nut 76 engaging a threaded portion 78 of the shaft 70. The fan 72 may be keyed or otherwise positively connected to the shaft 70 if necessary or desirable. A pulley 80 is affixed to the shaft 70 by a hub 81 and receives one or more V-belts (not shown) for driving one or more accessories, for example, a water pump, air conditioner compressor, generator, power steering pump or the like (not shown). The pulley 80 is illustrated as being constructed of stamped sheet steel, it may be constructed of cast iron, or other suitable material without departing from the spirit of the invention.

Thus by sizing the driven pulley at each accessory each accessory may be driven at a different speed which would of course be the optimum or maximum efficiency speed for that accessory; for purposes of description, this is related to "equivalent accessory speed" or the speed of the shaft 70.

Associated with the driven shaft 70 is a variable driveN pulley, generally identified as 82, which comprises a fixed flange 84 and a movable flange 86. Torque is transmitted from the pulley 13 to pulley 82 by a drive belt 88 of usual construction. The frictional engagement between the sides of the belt and the flanges provides the torque transmission. The fixed flange 84 is illustrated as being spot welded to the pulley 80; optionally, it may be an integral part if desired.

The movable flange 86 has a cylindrical hub portion 90 which surrounds a cylindrical portion 92 of the pulley 80. A bushing 94, constructed of nylon or the like, is interposed between the portion 92 and the hub 90. The movable flange 86 has a forwardly extending rim 96 which is received in a cup-like shroud 98 having a cylindrical hub or bearing support 100 surrounding the shaft 70. A bearing 102 is positioned between the hub 100 and a sleeve 101 surrouding the shaft 70. Abutting the forwardly extending rim 96 of the flange 86 of the pulley 82 and within the shroud 98 is a disc spring 104 of a construction similar to the disc spring 46, earlier described. Because of the similarity, the spring 104 is not separately illustrated as is the spring 46. The spring 104 has a plurality of radially inwardly extending fingers 112 which terminate in a central opening 106 of a size to be positioned over the shaft 70. The spring 104 has a plurality of open-ended slots 108 each terminating in enlarged openings 110 and defining the radial fingers 112. A pivot or drive hub 114 similar to that illustrated in FIG. 5 surrounds the shaft 70, and is clamped to the shaft 70 by the sleeve 101 and hubs 74 and 81. The hub may be keyed or otherwise positively connected to the shaft 70, if necessary or desirable. The hub 114 has fingers or tangs 116 each of which engages a slot 108 and arcuate surfaced pivot portions 118, each having a surface 120 engage the face 112 of a spring finger 112. The pivot surfaces 118 act as fulcrums for the spring 104. It is to be noted that like the drive pulley arrangement no disc pins, torque pins or keys are used to connect the spring 104 to the flange 86; only friction couples the spring 104 to the flange 86 and the shroud 98. The reasons for eliminating such connections are the same as described with respect to the drive pulley arrangement.

The spring 104 is pre-loaded by the selecting the length of the sleeve 101 and shoulder 81 and by tightening the nut 76 to properly position the parts as is illustrated in FIG. 1, (the idle condition). The spring is pre-loaded to a degree that it passes through center and such that it always exerts a force against the flange 86.

As with the spring 46, other structures can be provided to preload the spring 104 if desired.

The drive belt 88 provides the drive between the driveR pulley 13 and the driveN pulley 82, the drive ratio between the pulleys 13 and 82 being dependent on the position of the drive belt 88 relative thereto, which is dependent on the spacing of the flanges of the pulleys 13 and 82.

The driveN pulley 82 always maintains tension against the belt 88. The shifting of the flange spacing of both pulleys 13 and 82 is controlled by the speed of the driver shaft 10.

The ratio of the driveR pulley 13 and driveN pulley 82 speeds is substantially the same (see FIG. 6) from zero engine speed to a predetermined, first, engine speed. As engine speed increases beyond that first predetermined speed, centrifugal force causes the weights 56 to deflect outwardly gradually with increasing force as the speed increases. The spring 46 gradually from its FIG. 1 position is deflected toward the FIG. 2 position.

DriveR rotation causes centrifugal forces to act at the nominal center of gravity of the weights 56 which are attached to the driveR pulley. The centrifugal force acts through an increasing (changing) effective radius due to the geometry of the weights and is balanced against the (positive) spring rates of the driveR and driveN disc springs 46 and 104, respectively. The forces acting on the driveR spring cause a change in movable flange axial position and a change in the driveR pulley pitch diameter. The fixed length belt shifts on the driveN pulley changing the driveR-driveN speed ratios. The weights, center of gravity geometry, spring rates and flange pressures are selected so as to produce a "controlled" driveN speed responsive to the driveR speeds.

The weights 56 move outwardly, assuming that the engine speed is increasing, until they contact the spring retainer 42 — see FIG. 2 — at which time the spring 46 has deflected through center to its second maximum position (the first maximum or idle position being as illustrated in FIG. 1).

Thus, after reaching the maximum weight-deflection position, the drive ratio again becomes fixed because the belt has reached its FIG. 2 position, and a linear ratio, less than the initial 1 to 1 is again established between the pulleys. At this maximum weight-deflection position, the speed of the driven pulley varies in accordance with the fixed reduced ratio with further increases in the speed of the driveR pulley 13.

To illustrate a typical drive assembly according to this invention and to compare this with the usual drive conditions, input speed in RPM (corresponding to engine crankshaft speed) is plotted against equivalent accessory speed in RPM in the curve of FIG. 6. The operation of the unique mechanism described herein produces a three segment curve as illustrated by the solid line in FIG. 6. The curve is composed of segments $a$, $b$, and $c$ each of a different slope.

In looking at this Figure, segment $a$ of the curve shows the drive ratio according to this invention to be substantially 1:1.25 at crankshaft speeds up to about 1000 rpm. At about 1000 rpm the drive ratio begins to change to maintain a substantially uniform driveN pulley speed, up to about 3000 rpm represented by segment b. At speeds above 3000 rpm the drive ratio becomes fixed at a reduced ratio of less than 1 to 1:25 as represented by segment c of the curve. The ultimate rpm of the driveN pulley never reaches the rpm of the driveR. The particular curve of speed ratios between input speed of about 1000 rpm and 3000 rpm reflects the interaction of the several forces of the drive system, i.e., the belt forces, the spring forces and the centrifugal forces. It can be a straight, horizontal curve under some conditions.

To further explain the operation of the present drive mechanism and assuming that the idle pitch diameters of the driveR and driveN pulleys are of such diameters to provide a 1 to 1.25 drive speed ratio between the driveR and driveN shafts as is the case in the preferred embodiment, the curve is a straight line, as shown by segment a of FIG. 6. At a certain predetermined speed, centrifugal force acts to move the weights 56 outwardly toward their maximum outward positions. The effective pitch diameter of the driveR pulley becomes increasingly smaller since the belt tension and reduction in spring force will cause the belt to move closer to the driveR shaft. At the same time, because of reduction in belt tension and the spring force on the driveN pulley, the effective pitch diameter of the driveN pulley increases. Thus the interaction of the changing pitch diameters establishes a drive between the pulleys in the rpm range of segment b of the curve of FIG. 6, wherein driveR shaft speed (rpm) increases have little or no effect on driveN shaft speed (rpm). Thus the driveN shaft continues to be driven at a relatively constant speed during the period in which the weights move outwardly (or inwardly when driveR shaft speed decreases to the first predetermined speed). When the weights have reached their maximum position, there is no further change in effective pitch diameters of the pulleys and the pulleys are locked together for rotation at that same drive ratio with further increases in driveR shaft speed. This fixed ratio is always less than the initial ratio, assumed for discussion to be 1 to 1:25. The second fixed ratio can be determined from the lock up speed, of the driveR shaft which in the illustration is 3000 rpm and the lock up speed of the driveN shaft, i.e., about 1000 rpm (ideally) to be determined by the particular accessory manufacturer or the manufacturer of the vehicle. Thus in the example described, the lock up ratio or ratio reached at 3000 RPM of driveR pulley to driveN pulley is about 3 to 1. In a specific American made vehicle, for example, a 1974 or 1975 Nova, with standard drive axle ratio, the vehicle speed at a crankshaft speed of about 1300 rpm is approximately 30 miles per hour and at a crankshaft speed of about 3000 rpm is approximately 75 miles per hour.

When the speed of the driveR shaft decreases to a value of less than 3000 rpm the weights begin to move inwardly toward their idle position and the movable pulley is urged toward the fixed pulley by the spring force. This urges the belt to ride higher in the driveR pulley and at the same time, the belt tension forces the movable pulley of the driveN pulley to move away from the fixed pulley thereof. There is again established the drive ratio in the b portion of the curve of FIG. 6 and then to the a portion of the curve of FIG. 6.

The broken line curve illustrates a conventional drive ratio between the crankshaft and the driven shaft from which the accessories are driven, i.e., a continual 1 to 1:25 ratio in which the effective speed of the accessories increases with the crankshaft speed at this fixed ratio.

The disc springs used in the preferred embodiment of this invention have an $h/t$ (formed height of the unloaded spring to thickness) ratio of about one, expressed in the same units of measure, as indicated in FIG. 4. The spring rate of such disc springs in the preferred embodiment is positive i.e., is continuously positive in slope as is illustrated in FIGS. 7 and 8; and can be compared to the curves of spring rates of other types of springs, as for example, typical Belleville springs, corrugated Belleville springs, and typical coil springs, the spring rate curves of which are illustrated in FIG. 9.

Figure 8:
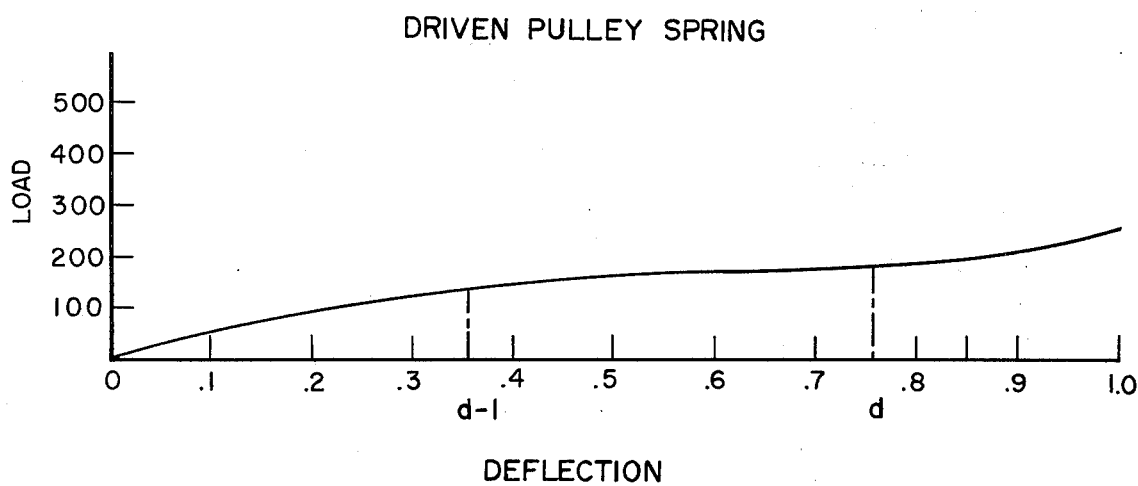
FIG. 8 is a curve in which load is plotted against deflection of a driveN spring for a specific drive system for a drive constructed according to this invention.

FIGS. 7 and 8 are load v. deflection curves for the preferred embodiment driveR disc spring 46 and the driveN disc spring 104, respectively. These are the spring curves to produce the results in FIG. 6. While the springs 46 and 104 are physically similar in construction, except for thickness, they are preloaded to different amounts, as indicated in the curves when the drive system of this invention is assembled for installation in a vehicle.

The spring 46 is preloaded as explained to a particular deflection D; it must maintain a force on the movable pulley 16 at idle speeds, so that slippage of the belt is minimized. At a certain crankshaft rpm, the spring 46 is deflected by centrifugal force acting on the weights 56 to a second deflection D-1. The curve between the idle and fully shifted positions is positive and generally linear. There is no deflection surge or snap action; the deflection is gradual.

The spring 104 is loaded through center to a particular deflection d, so as to continually exert a force against the movable pulley flange 86. As the tension on the belt 88 decreases due to the change occurring in the driveR pulley, the flange 86 is urged toward the flange 84, such that the deflection of the spring 104 decreases generally uniformly with little decrease in load between the preload or idle position (FIG. 1) and the high speed position (FIG. 2). The high speed deflection is indicated as d-1.

The curves of FIGS. 6, 7 and 8 relate to a specific example of the drive of this invention. In this specific example, the specifics of which are given by way of illustration and not by way of limitation, the diameter of the driveR pulley 13 is 7.125 inches, the diameter of the driveN pulley 82 is 7.440 inches. The driveR spring 46 has an outer diameter of 7.810 inches while the driveN spring 104 has an outer diameter of 7.810 inches. Each weight 56 is 90 grams; there are 18 weights, located 0.195 inch from the end of each slot in the driveR spring 46. The $h/t$ ratio of the driveR spring is 1.024; $h$ being nominally 0.128 inch and $t$ being nominally 0.125 inch. The $h/t$ ratio of the driveN spring is 1.223; $h$ being nominally 0.115 inch and $t$ being nominally 0.094 inch.

The belt used in this example is a 16 26 V 341. This belt is 1 inch wide, has a 26° included angle, is a V-belt with a pitch length of 34.1 inches.

Tests to determine the advantages from using this invention have been conducted by installing drive systems as per the example given in a 1974 Chevrolet Nova, 350 C.I.D. engine with an air pump and an automatic transmission and of course, the normal accessories, such as air conditioning, a water pump, power steering, alternator and fan. Tests have been conducted with the air conditioning operating and non-operating (from the dash controls) and also in a 1975 Chevrolet Nova with the same accessories but having a catalytic converter and no air pump. In both vehicles, the rear axle ratio was 2.73.

A tabulation of results for one-third town and rural two lane driving; two-thirds freeway driving; average speed 44 mph, is as follows:

```
                1975 NOVA
            STOCK ACCESSORY DRIVE
1. A/C on:   1833.0 miles; 108.60 gallons
             gasoline (pump measured); avg. 16.87 mpg.
2. A/C off:  1525 miles; 83.40 gallons gasoline
             (pump measured) avg. 18.29 mpg.

ACCESSORY DRIVE ACCORDING TO INVENTION
1. A/C on:   1372.2 miles; 75.80 gallons gasoline
             (pump measured) 18.12 mpg.
2. A/C off:  764.90 miles; 41.05 gallons gasoline
             (pump measured) 18.63 mpg.
             Comparison - using this invention
  A/C on     8.31% advantage - fuel savings
  A/C off    2.31% advantage - fuel savings 1974 NOVA
            STOCK ACCESSORY DRIVE
1. A/C on:   773.9 miles; 50.55 gallons
             gasoline (pump measured); avg. 15.31 mpg.
2. A/C off:  759.20 miles; 44.85 gallons gasoline
             (pump measured) avg. 16.93 mpg.

ACCESSORY DRIVE ACCORDING TO INVENTION
1. A/C on:   2264.90 miles; 135.05 gallons gasoline
             (pump measured) 16.77 mpg.
2. A/C off:  3482.6 miles; 201.90 gallons gasoline
             (pump measured) 17.25 mpg.
Comparison - using this invention
  A/C on     9.54% advantage - fuel savings
  A/C off    1.90% advantage - fuel savings
```

FIG. 9 illustrates load v. deflection curves for various springs. Curve A is for a typical Belleville spring; note that a portion of the curve is negative. Curve B is a positive rate disc spring; similar to that used herein. Curve C is a curve for another disc spring having a portion of zero rate. Curve D is an ideal curve for a coil spring a linear relationship exists between load and deflection; it does not indicate instabilities which may occur during use which are indicated in the broken line curve designated $D^1$.

FIG. 10 illustrates the speed relationship between the driveR and driveN pulleys in a conventional variable pulley transmission. As the driveR rpm increases, the driveN rpm increases at an even faster rate; until the driveR pulley rpm reaches a certain value, no power is transmitted to the driveN pulley.

While one specific example of the preferred embodiment of the invention has been fully described, other embodiments of the invention and within its scope will be readily apparent to those skilled in the art.

I claim:

1. Apparatus for driving accessories (and adapted to be) disposed between a drive shaft connected to an engine in a vehicle and a driven shaft connected to one or more accessories; the combination comprising:

a first variable pulley rotationally associated with the drive shaft and having a fixed flange (adapted for connection) connected to the drive shaft and a movable flange movable axially of said fixed flange and the drive shaft;

means for moving said movable flange axially away from said fixed flange above a predetermined speed above zero speed of the drive shaft;

said moving means comprising a disc spring (adapted to bias) biasing said movable flange and centrifugally responsive means associated with said disc spring actuated by centrifugal force above (the) said predetermined speed of the drive shaft to change the bias of said spring and effect movement of said movable flange;

a second variable pulley rotationally associated with the driven shaft and the accessories and having a fixed flange (adapted for connection) connected to the driven shaft and a movable flange movable axially of said fixed flange and said driven shaft;

disc spring means urging said movable flange of said second pulley axially toward said fixed flange thereof;

drive means between said variable pulleys effective to provide the drive therebetween with the drive ratio between the pulleys (being) determined by the position of the movable flanges with respect to their respective fixed flanges;

said apparatus being constructed and arranged to provide substantially a fixed ratio drive between the (driving) drive and driven shafts at relatively low (driving) drive shaft speeds and also to provide substantially a constant speed of the driven shaft for speeds for the (driving) drive shaft above said predetermined speed thereof throughout the major portion of the normal vehicle operating range.

2. Apparatus as recited in claim 1, wherein said drive means comprises a flexible belt.

3. Apparatus as recited in claim 1 wherein said disc spring and said disc spring means are conical and each has an $h/t$ ratio of about 1, where $h$ is the initial formed height and $t$ is the thickness thereof.

4. Apparatus as recited in claim 3 wherein the spring rate curve is continuously positive in slope.

5. Apparatus as recited in claim 1 wherein said drive spring is coupled to said drive shaft and said disc spring means is coupled to said driven shaft.

6. Apparatus as recited in claim 1 wherein said disc spring and said disc spring means have a plurality of radially inwardly extending fingers.

7. Apparatus as recited in claim 1 wherein said disc spring is pre-loaded to a first deflection position, so that centrifugal force on said weights acts at said first predetermined drive shaft speed and said deflection increases as said weights move outwardly.

8. Apparatus as recited in claim 1 wherein said disc spring means pre-loaded to a deflection to urge said movable flange toward the fixed flange of said second pulley, which deflection decreases as said weights move outwardly.

9. Apparatus as recited in claim 1 further comprising stop means limiting the outward movement of said weights at a second determined speed of said drive shaft, which speed is above said predetermined speed.

10. Apparatus as recited in claim 9 wherein said drive and driven shafts are coupled to rotate at a second fixed ratio at said second determined speed of said drive shaft.

11. Apparatus as recited in claim 10 wherein said apparatus is so constructed and arranged that said second fixed ratio is different from the first named fixed ratio.

12. A drive mechanism adapted to transmit drive between a drive shaft and a driven shaft comprising:
a first variable pulley adapted to be rotationally associated with the drive shaft and having a fixed flange adapted for connection to the drive shaft and a movable flange movable axially of said fixed flange and the drive shaft;
means for moving said movable flange axially away from said fixed flange above a predetermined speed above zero speed of the drive shaft;
said moving means comprising a disc spring and centrifugally responsive means associated with said disc spring actuated by centrifugal force above the predetermined speed of the drive shaft to change the loading of said spring and effect movement of said movable flange;
a second variable pulley adapted to be rotationally associated with the driven shaft and having a fixed flange adapted for connection to the driven shaft and a movable flange movable axially of said fixed flange and said driven shaft;
disc spring means urging said movable flange of said second pulley axially toward said fixed flange thereof;
said variable pulleys being adapted to be drivingly connected, the drive ratio between the pulleys being determined by the position of the movable flanges with respect to their respective fixed flanges;
whereby said apparatus provides a substantially constant speed of the driven shaft for speeds of the driving shaft above said predetermined speed thereof throughout the major portion of the normal operating range of speed of said drive shaft.

13. A variable pulley mechanism for use in pulley drive transmissions comprising a fixed flange adapted for connection to a shaft and a movable flange movable axially of said fixed flange and said shaft;
means for moving said movable flange axially with respect to said fixed flange above a predetermined speed above zero speed of said shaft;
said moving means comprising a disc spring and centrifugally responsive means associated with said disc spring actuated by centrifugal force above the predetermined speed of the shaft to change the loading of said spring and effect movement of said movable flange;
said disc spring being coupled to said shaft and having a plurality of radially inwardly directed fingers; and
a fulcrum means associated with said shaft having an arcuate fulcrum surface engaging said spring fingers;
said fingers moving relative to said fulcrum surface when the loading on said spring is changed.

14. A variable pulley mechanism as recited in claim 13, further including a plurality of tangs extending between fingers of said spring.

15. In an accessory drive, the combination comprising drive input means associated with and responsive to the speed of a prime mover, drive output means associated with and effective to drive accessories, and speed control means variable in response to the speed of said drive input means (adapted to be) disposed between said drive input means and said drive output means for providing a linear speed drive relationship therebetween below a relatively low and above zero speed of said drive input means and also for providing a controlled variable speed drive relationship therebetween over substantially the normal range of speed of said drive input means in excess of said relatively low speed, the variable speed drive relationship being characterized in that the speed of said drive output means remains substantially constant during the speeds of said drive input means above said relatively low speed over substantially the normal range of speed of said drive input means in excess of said relatively low speed, said speed control means comprising:
a first variable pulley rotationally associated with said drive input means and having a fixed flange (adapted for connection) connected to said drive input means and a movable flange movable axially of said fixed flange and said drive input means;
means for moving said movable flange axially away from said fixed flange above said low speed of said drive input means;
said moving means comprising a disc spring and centrifugally responsive means associated with said disc spring actuated by centrifugal force above said low speed of said drive input means to change the loading of said spring and effect movement of said movable flange;
a second variable pulley rotationally associated with said drive output means and said accessories and having a fixed flange (adapted for connection) connected to the drive output means and a movable flange movable axially of said fixed flange and said drive output means;
disc spring means urging said movable flange of said second pulley axially toward said fixed flange thereof; and
means drivingly interconnecting the first and second pulley means, the speed relationship therebetween being determined by said centrifugally responsive means.

16. An accessory drive as recited in claim 15 wherein said drive means comprises a flexible belt.

17. An accessory drive as recited in claim 15 wherein said disc spring and said disc spring means are conical and each has an $h/t$ ratio of about 1, where $h$ is the initial formed height and $t$ is the thickness thereof.

18. An accessory drive as recited in claim 17 wherein the spring rate curve is continuously positive in slope.

19. An accessory drive as recited in claim 15 wherein said disc spring is coupled to said drive input means at its outer periphery and said disc spring means is coupled to said drive output means.

20. An accessory drive as recited in claim 15 wherein said disc spring and said disc spring means have a plurality of radially inwardly extending fingers.

21. An accessory drive as recited in claim 15 wherein said disc spring is pre-loaded to a first deflection position, so that centrifugal force on said weights acts above said low speed of said drive input means and said deflection increases as said weights move outwardly.

22. An accessory drive as recited in claim 15 wherein said disc spring means is pre-loaded to a deflection to urge said movable flange toward the fixed flange of said second pulley, which deflection decreases as said weights move outwardly.

23. An accessory drive as recited in claim 15 further comprising stop means limiting the outward movement of said weights at a second speed of said drive input means which speed is above said first named speed.

24. An accessory drive as recited in claim 23 wherein said input drive means and output drive means are coupled to rotate at a second fixed ratio at said second speed of said input drive means.

25. An necessary drive as recited in claim 24 wherein said apparatus is so constructed and arranged that said second fixed ratio is different from the first named fixed ratio.

* * * * *

UNITED STATES PATENT OFFICE
CERTIFICATE OF CORRECTION

Patent No. 4,020,711　　　　Dated May 3, 1977

Inventor(s) Gary A. Woollard

It is certified that error appears in the above-identified patent and that said Letters Patent are hereby corrected as shown below:

Column 12, line 1 of Claim 25, "necessary" should read -- accessory --.

Signed and Sealed this ninth Day of August 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 4,020,711
DATED : May 3, 1977
INVENTOR(S) : Gary A. Woollard

It is certified that error appears in the above-identified patent and that said Letters Patent are hereby corrected as shown below:

The following errors are corrected under the provisions of Rule 323:

Column 9, lines 60 and 61 cancel "(and adapted to be)".

Column 9, lines 65 and 66, cancel "(adapted for connection)".

Column 10, lines 4 and 5, cancel "(adapted to bias)".

Column 10, line 7, cancel "(the)".

Column 10, line 13, cancel "(adapted for connection)".

Column 10, line 21, cancel "(being)".

Column 10, line 26, cancel "(driving)".

Column 10, line 27, cancel "(driving)".

Column 10, line 29, cancel "(driving)".

Column 11, line 6 of Claim 15, cancel "(adapted to be)".

Column 12, line 9, cancel "(adapted for connection)".

UNITED STATES PATENT OFFICE
CERTIFICATE OF CORRECTION

Patent No. 4,020,711  Dated May 3, 1977

Inventor(s) Gary A. Woollard

It is certified that error appears in the above-identified patent and that said Letters Patent are hereby corrected as shown below:

Column 12, line 23, cancel "(adapted for connection)".

Signed and Sealed this

Fourth Day of October 1977

[SEAL]

Attest:

RUTH C. MASON
*Attesting Officer*

LUTRELLE F. PARKER
*Acting Commissioner of Patents and Trademarks*